US008606477B2

(12) United States Patent
Stan

(10) Patent No.: US 8,606,477 B2
(45) Date of Patent: Dec. 10, 2013

(54) METHOD AND DEVICE FOR CONTROLLING AN ELECTRICALLY ACTUABLE BRAKE AND AN ELECTRONIC BRAKE SYSTEM

(75) Inventor: Marian Stan, Timisoara (RO)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 13/703,762

(22) PCT Filed: May 11, 2011

(86) PCT No.: PCT/EP2011/057610
§ 371 (c)(1),
(2), (4) Date: Dec. 12, 2012

(87) PCT Pub. No.: WO2011/157492
PCT Pub. Date: Dec. 22, 2011

(65) Prior Publication Data
US 2013/0090827 A1 Apr. 11, 2013

(30) Foreign Application Priority Data

Jun. 15, 2010 (EP) ..................................... 10464005
Jul. 23, 2010 (DE) .......................... 10 2010 038 306

(51) Int. Cl.
*B60T 8/17* (2006.01)

(52) U.S. Cl.
USPC ............................................. 701/70; 188/138

(58) Field of Classification Search
USPC .............. 701/36, 48, 70, 74, 78–83; 188/137, 188/138; 340/52, 426.32; 180/275, 370
See application file for complete search history.

(56) References Cited

U.S. PATENT DOCUMENTS

| 6,345,225 B1 * | 2/2002 | Bohm et al. ..................... 701/70 |
| 2003/0020327 A1 | 1/2003 | Isono et al. |
| 2003/0125863 A1 * | 7/2003 | Tamasho et al. ................ 701/70 |

(Continued)

FOREIGN PATENT DOCUMENTS

| DE | 195 02 925 A1 | 1/1996 |
| DE | 195 38 794 A1 | 4/1997 |

(Continued)

OTHER PUBLICATIONS

German Examination Report—Nov. 11, 2010.

(Continued)

*Primary Examiner* — Mary Cheung
*Assistant Examiner* — Rodney Butler
(74) *Attorney, Agent, or Firm* — Brinks Gilson & Lione

(57) ABSTRACT

A method for controlling an electrically actuated brake including determining an actuator clamping force actual value ($F_{ist}$), using a force sensor and determining an actuator position actual value ($\varphi_{ist}$) or an actuator speed actual value ($n_{ist}$) using a position sensor for activating the actuator by a controller. The controller includes a selection and evaluation device. The selection and evaluation device supplies to the controller input reference value ($\varphi_{in\text{-}soll}$) and a controller input actual value ($\varphi_{in\text{-}ist}$). The controller input variables ($\varphi_{in\text{-}soll}$, $\varphi_{in\text{-}ist}$) are made available by the selection and evaluation device such that the controller can be operated in at least two control modes. The control modes include a force control (M1) for adjusting an actuator clamping force reference value ($F_{soll}$), or position control (M3, M4) for adjusting an actuator position reference value ($\varphi_{soll}$, $\Delta\varphi_{soll}$), or speed control (M2) for adjusting an actuator speed reference value ($n_{soll}$).

14 Claims, 4 Drawing Sheets

(56) References Cited

U.S. PATENT DOCUMENTS

| | | | |
|---|---|---|---|
| 2003/0160503 A1 | 8/2003 | Riddiford | |
| 2006/0082217 A1 | 4/2006 | Hatano et al. | |
| 2008/0255743 A1* | 10/2008 | Tanaka et al. | 701/70 |
| 2011/0226569 A1* | 9/2011 | Devlieg | 188/158 |

FOREIGN PATENT DOCUMENTS

| | | |
|---|---|---|
| DE | 197 30 094 A1 | 1/1999 |
| DE | 102 33 196 A1 | 2/2003 |
| DE | 103 02 515 A1 | 8/2004 |
| DE | 10 2009 008 944 A1 | 8/2010 |
| DE | 10 2010 002 406 A1 | 9/2011 |
| FR | 2 924 082 | 11/2007 |
| WO | WO 99/26829 | 6/1999 |
| WO | WO 01/68428 A1 | 9/2001 |
| WO | WO 2005/100113 A1 | 10/2005 |
| WO | WO 2005/100114 A1 | 10/2005 |
| WO | WO 2006/111393 A1 | 10/2006 |
| WO | WO 2008/025797 A1 | 3/2008 |

OTHER PUBLICATIONS

PCT International Search Report—Aug. 2, 2011.

* cited by examiner

METHOD AND DEVICE FOR CONTROLLING AN ELECTRICALLY ACTUABLE BRAKE AND AN ELECTRONIC BRAKE SYSTEM

CROSS-REFERENCE TO RELATED APPLICATIONS

This application claims priority to European Patent Application No. 10464.005.7, filed Jun. 15, 2010, German Patent Application No. 10 2010 038 306.6, filed Jul. 23, 2010, and PCT/EP2011/057610, filed May 11, 2011.

FIELD OF THE INVENTION

This invention relates to a method and device for controlling a motor vehicle brake system which can be actuated electrically by means of an actuator. It further relates to an electronic brake system having such a device.

BACKGROUND AND SUMMARY OF THE INVENTION

A method and a control system for exerting defined caliper clamping forces in a disk brake which can be actuated by means of an electric motor are known from the international patent application WO 05/100114. In that case the control system has a cascade structure consisting of three successive controllers, namely a first controller in the form of a force-travel controller, a second controller connected downstream of the first controller, in the form of a rotational speed controller, and a third controller, connected downstream of the second controller, in the form of a current controller. Only a clamping force reference value is supplied to the control system; that is to say that force control for adjusting this clamping force reference value is possible with the control system.

DE 103 02 515 A1 describes a device and a method for controlling the force and position of an electric brake system of a motor vehicle. The control system structure can be operated in two operating modes, force control or position control, transfer between the operating modes being effected by a switch whereby the position reference value for the engine controller is made available either by a force controller or by a further unit. The control system structure described therefore comprises, so to speak, two parallel units (force controller and further unit), only one of the two units being used for a prescribed operating mode.

It is therefore the object of the present invention to propose a method and a device for controlling a brake which can be actuated electrically by means of an actuator, which method and device can execute situation-adapted control using a unified, in particular simple, controller device.

This object is achieved by a method and device according to the invention.

The invention is based on the concept that the controller device includes, in addition to a predefined, unified controller structure to which a predefined type of controller structure input variables are supplied, a selection and evaluation device which determines the appropriate controller structure input variables from the input variables of the controller device, so that the controller device, despite having a permanently pre-defined controller structure, can execute at least two different control modes, such as force control or speed control or position control.

According to the invention the term actuator position is understood to mean, in addition to a position, for example the axial position of a spindle of the actuator, also an angle, for example the angle of a rotor of the actuator, or another variable-characterizing position.

An advantage of the invention is that, for the same functionality, the number of necessary controllers/units, and therefore the production costs, can be reduced, as compared to the known control system structures.

A further advantage of the invention lies in the unified, simple structure, resulting in simpler activation, for example when the controller device must be re-initialized.

Furthermore, as a result of the unified structure, switching between control modes is possible in a simple manner, without, for example, the need to execute switching processes in the controller itself. In this way the occurrence of undefined controller states is avoided.

Preferably, the controller device can be operated using the same controller structure in at least three control modes, force control or position control or speed control.

To make possible selection of the control modes, a control mode parameter, by which the control mode to be implemented by the controller device is determined, is preferably supplied as an input variable to the selection and evaluation device. The further input variables of the selection and evaluation device depend on the control mode parameter, at least one actuator actual value and at least one actuator reference value being made available to the selection and evaluation device. Especially preferably, actual values for the actuator clamping force and the actuator position are supplied to the selection and evaluation device independently of the control mode parameter, the selection and evaluation device using for evaluation only the actual value required for the control mode at the time.

According to a preferred embodiment of the invention, the controller structure includes at least one position controller and the selection and evaluation device makes available to the controller structure in each control mode an actuator position as a controller structure input reference value and controller structure input actual value.

According to an advantageous development of the invention, the controller structure includes a position controller, with a speed controller connected downstream of the position controller. An actuator speed reference value output by the position controller and the actuator speed actual value are then supplied as input variables to the speed controller. Especially preferably, the controller structure includes no further controller, so that the speed controller outputs the manipulated variable for the actuator. Advantageously, the position controller includes a speed limitation which limits the actuator speed reference value output by the position controller to a predefined maximum value in order to protect the actuator from damage.

In order to execute speed control, in accordance with a preferred embodiment of a method according to the invention a reference value for the actuator position is determined, in the selection and evaluation device, from the actuator clamping force reference value supplied to the selection and evaluation device with reference to a predefined relationship between actuator position and actuator clamping force, and an actual value for the actuator position is determined from the actuator clamping force actual value supplied to the selection and evaluation device. These determined reference and actual values for the actuator position are output to the position controller as controller structure input reference value and controller structure input actual value.

For rapid determination of the reference and actual values for the actuator position, the predetermined relationship between actuator position and actuator clamping force is preferably stored in the form of a table in the selection and evaluation device.

According to a further preferred embodiment of a method according to the invention, for speed control an actuator speed reference value and an actuator position actual value are supplied to the selection and evaluation device. In the selection and evaluation device a reference value for the actuator position is determined from the actuator speed reference value and is supplied to the position controller together with the actuator position actual value.

In the case of a speed controller connected downstream of the position controller, in a speed control operation the reference value for the actuator position is preferably determined from the actuator speed reference value, in the selection and evaluation device, in such a way that the actuator speed reference value output by the position controller corresponds to the actuator speed reference value which was supplied to the selection and evaluation device. A speed control operation can therefore be carried out by a predefined controller structure having an external position controller and an internal speed controller.

The controller device can preferably be operated in a control mode with relative position control. For this purpose a relative actuator position reference value reproducing a desired position change, and an actuator position actual value, are supplied to the selection and evaluation device. The selection and evaluation device determines by addition, from the relative actuator position reference value and an actuator position value stored prior to entering the relative position control mode, a reference value for the actuator position, which is output to the position controller together with the actuator position actual value.

Preferably, the controller device can be operated alternatively or additionally in a control mode with absolute position control, in which at least one actuator position reference value and an actuator position actual value are supplied to the selection and evaluation device, which values are supplied as controller structure input reference value and controller structure input actual value to the position controller of the controller structure.

According to a preferred embodiment of the invention, the control mode parameter and the at least one actuator reference value are supplied to the selection and evaluation device by a higher-level electronic control and regulation unit. Information and/or requests, for example regarding the driver braking wish, demands of a slip control system (ABS: antilock system, TCS: traction control system) or driver assistance system (ESC: electronic stability control), initialization request, request for brake lining clearance adjustment, are usually present at the higher-level electronic control and regulation unit, so that appropriate control of the brake can be decided in the higher-level electronic control and regulation unit and the corresponding actuator reference value is determined.

The invention also relates to an electronic brake system for a motor vehicle comprising at least one brake which can be actuated electrically by means of an actuator, and a control and regulation unit, the control and regulation unit having at least one device according to the invention or being connected to at least one device according to the invention.

BRIEF DESCRIPTION OF THE DRAWINGS

Further preferred embodiments of the invention are apparent from the following description with reference to figures, in which.

DETAILED DESCRIPTION OF THE INVENTION

Figure 1:
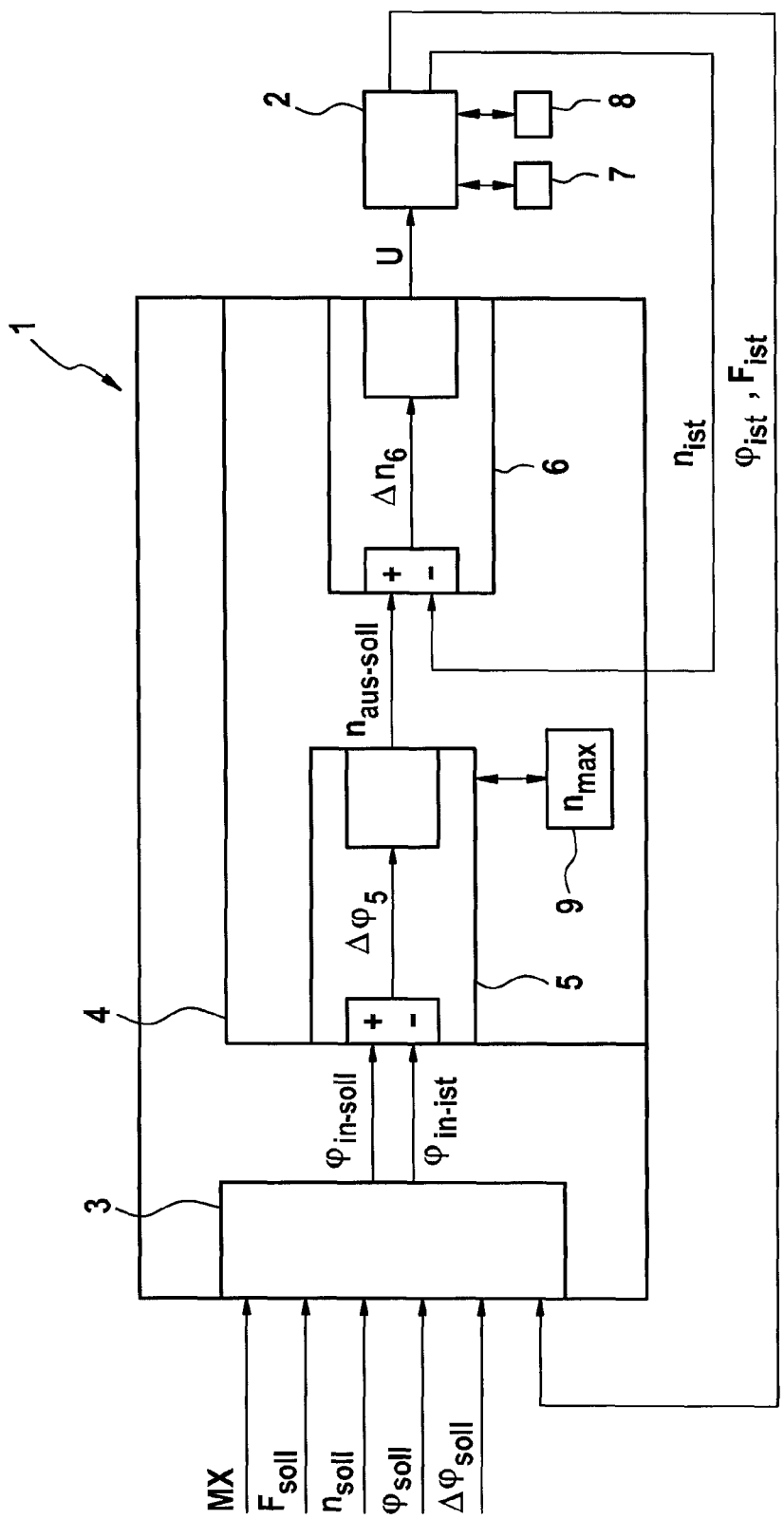
FIG. 1 shows schematically an exemplary embodiment of a device according to the invention.

FIG. 1 represents schematically an exemplary embodiment of the device according to the invention. The device includes a controller device 1 with which an actuator 2 of an electromechanically actuable brake is activated via a manipulated variable U, for example a voltage. The clamping force $F_{ist}$ of the brake is measured by means of a clamping force sensor 7. In addition, the respective actual actuator position $\phi_{ist}$ is measured by a position measuring system 8. The actuator position measurement may be implemented by measuring an angle, for example of the actuator or a transmission connected to the output of the actuator, or a position, for example an axial position of a spindle driven by the actuator. The actuator speed $n_{ist}$ (or actuator rotational speed) is formed in the example by differentiating the signal of the position measuring system 8 corresponding to the measured actuator position. Alternatively or additionally, the actuator speed $n_{ist}$ may also be measured with an additional actuator speed sensor.

The controller device 1 includes a selection and evaluation device 3 and a controller structure 4. A control mode parameter MX, which determines the desired control mode (force control or position control or speed control) of the controller device 1, and at least one reference value $F_{soll}$, $\phi_{soll}$, $\Delta\phi_{soll}$, $n_{soll}$, as reference input variable for the control, are supplied to the selection and evaluation device 3 as input variables. The selection and evaluation device 3 outputs, independently of the controller, a reference value $\phi_{in\text{-}soll}$ and an actual value $\phi_{in\text{-}ist}$ of a predetermined actuator variable (for example, actuator position $\phi$ or actuator clamping force F or actuator speed n) which are supplied to the controller structure 4 as controller structure input reference value and controller structure input actual value (controller structure input variables). In the example the predetermined actuator variable is the actuator position; that is, the selection and evaluation device 3 outputs a position reference value and a position actual value as controller structure input reference value $\phi_{in\text{-}soll}$ and controller structure input actual value $\phi_{in\text{-}ist}$ to the controller structure 4. In addition, in the example the actuator clamping force actual value $F_{ist}$ and the actuator position actual value $\phi_{ist}$ are supplied to the selection and evaluation device 3 as input variables.

The controller structure 4 includes in the example a position controller 5 (P controller) and a speed controller 6 (PI controller) connected downstream of the position controller 5. The position controller 5 outputs as an output variable an actuator speed reference value $n_{aus\text{-}soll}$ which is transmitted as an input variable to the downstream speed regulator 6. In addition, the actuator speed actual value $n_{ist}$ is supplied to the speed controller 6.

Optionally, an actuator speed limitation 9 may be present, which limits the actuator speed reference value $n_{aus\text{-}soll}$ output by the position controller 5 to a predetermined maximum value $n_{max}$ in order to protect the actuator 2 from damage.

The operation of the device represented in FIG. 1, or the implementation of a method according to the invention, is explained in more detail below, in particular with reference to FIGS. 2 and 3.

Figure 2:
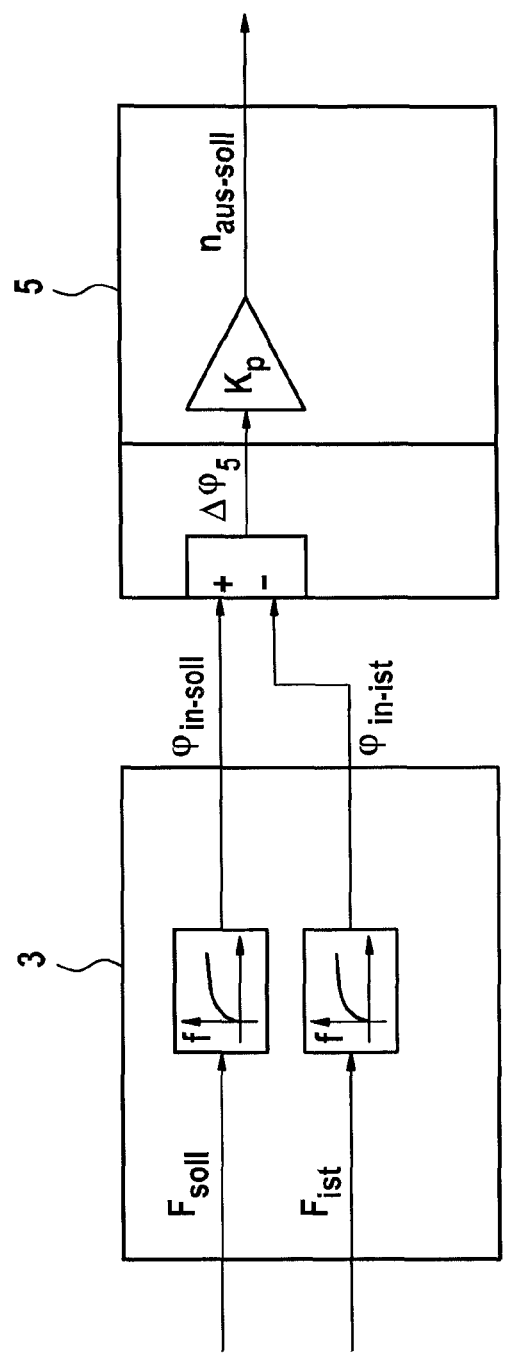
FIG. 2 shows schematically an exemplary embodiment of a method according to the invention for executing force control.

In FIG. 2 an exemplary embodiment of a method according to the invention for executing force control is represented schematically. In force control (characterized by a control mode parameter M1), at least an actuator clamping force actual value $F_{ist}$ and an actuator clamping force reference value $F_{soll}$ are supplied to the controller device 1 as input variables. In the selection and evaluation device 3 a corresponding actual value $\phi_{in-ist}$ and a corresponding reference value $\phi_{in-soll}$ for the actuator position are determined from the actuator clamping force actual value $F_{ist}$ and the clamping actuator force reference value $F_{soll}$. This is effected with the aid of a predetermined functional relationship f between the actuator position $\phi$ and the actuator clamping force F which is characteristic of the brake used. The functional relationship f, which is represented schematically as a characteristic curve in FIG. 2, may be predefined, for example, in the form of a table or in the form of a mathematical formula. The actual and reference values $\phi_{in-ist}$, $\phi_{in-soll}$ determined with reference to the functional relationship f are supplied to the position controller 5, which is implemented as a P controller with a proportional component of the amplification $K_p$. In the position controller 5 the difference is formed from reference value $\phi_{in-soll}$ and actual value $\phi_{in-ist}$, which difference is denoted as the position error $\Delta\phi_5$. The position controller 5 has the task of ensuring that the actual value $\phi_{in-ist}$ follows the reference value $\phi_{in-soll}$, that is, that the position error $\Delta\phi_5$ becomes zero. The output of the position controller 5 is a corresponding reference value $n_{aus-soll}$ for the following speed controller 6. The speed controller 6 evaluates the deviation $\Delta n_6$ between the actuator speed reference value $n_{aus-soll}$ and the actuator speed actual value $n_{ist}$, which deviation is also supplied to the speed controller 6, and outputs a corresponding manipulated variable U to the actuator 2 (see FIG. 1).

Figure 3:
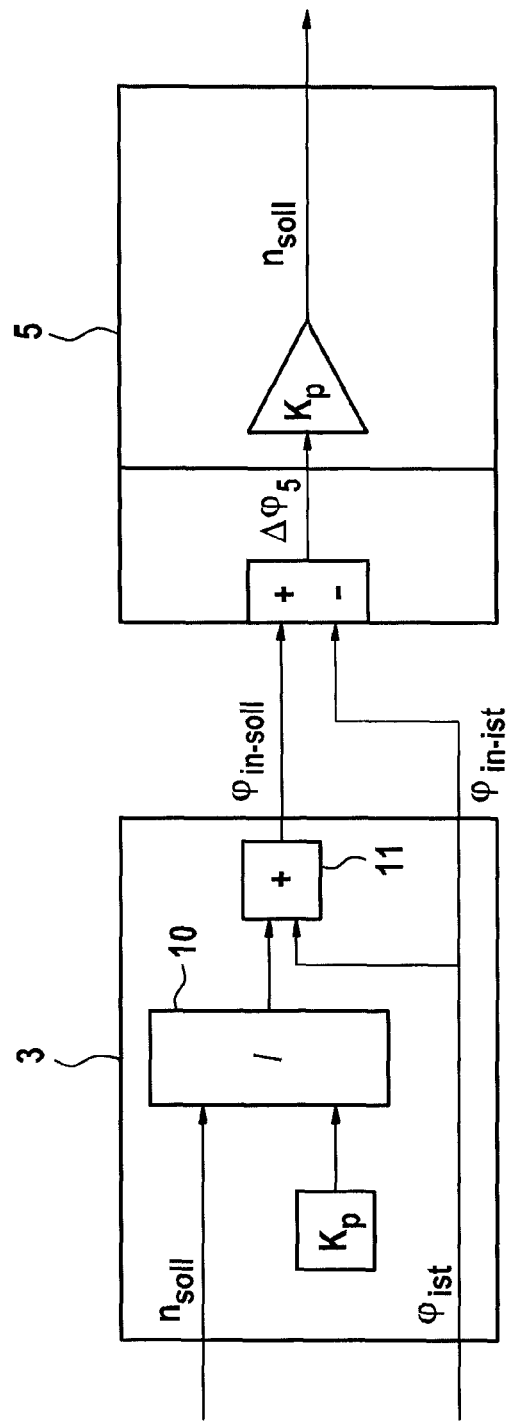
FIG. 3 shows schematically an exemplary embodiment of a method according to the invention for executing speed control.

FIG. 3 represents schematically an exemplary embodiment of a method according to the invention for executing speed control. In speed control (characterized by a control mode parameter M2), at least an actuator position actual value $\phi_{ist}$ and an actuator speed reference value $n_{soll}$ are supplied to the controller device 1 as input variables. In the selection and evaluation device 3 a reference value $\phi_{in-soll}$ for the actuator position is determined from the actuator speed reference value $n_{soll}$ in such a way that the actuator speed reference value $n_{aus-soll}$ output by the following position controller 5 corresponds to the actuator speed reference value $n_{soll}$ supplied to the selection and evaluation device 3. For this purpose, in the case that the position controller 5 is implemented as a P controller with an amplification $K_p$, the actuator speed reference value $n_{soll}$ is divided by the amplification $K_p$ (block 10) and added to the actuator position actual value $\phi_{ist}$ (block 11). The result is supplied to the position controller 5 as a reference value $\phi_{in-soll}$ together with the actuator position actual value $\phi_{ist}$ as controller structure input variables $\phi_{in-soll}$, $\phi_{in-ist}$. A control operation by position controller 5 and speed controller 6 then follows, as explained with reference to FIG. 2.

In position control, two types of control can be distinguished: a "relative" position control (characterized by a control mode parameter M3) in which a relative actuator position reference value $\Delta\phi_{soll}$ is supplied to the controller device 1 as an input variable in addition to the actuator position actual value $\phi_{ist}$, the relative actuator position reference value $\Delta\phi_{soll}$ corresponding to a desired actuator position change; and an "absolute" position control (characterized by a control mode parameter M4) in which an absolute actuator position reference value $\phi_{soll}$ is supplied to the controller device 1 as an input variable in addition to the actuator position actual value $\phi_{ist}$, the actuator position reference value $\Delta\phi_{soll}$ corresponding to the desired absolute actuator position.

For "relative" position control M3, the actuator position $\phi_{ist}$ is temporarily stored in an intermediate store, for example in the selection and evaluation device 3, so that upon entry to the "relative" position control M3 an actuator position value $\phi_{store}$ is available from a time shortly before entry to the position control M3. For the "relative" position control, a controller structure input reference value $\phi_{in-soll}$ is determined by addition, in the selection and evaluation device 3, from the relative actuator position reference value $\Delta\phi_{soll}$ and the actuator position value $\phi_{store}$ stored prior to entry to the control mode M3, according to $$\phi_{in-soll} = \phi_{store} + \Delta\phi_{soll},$$

and is output to the position controller 5.

In "absolute" position control M4, the actuator position reference value and actual value $\phi_{soll}$, $\phi_{ist}$ supplied to the selection and evaluation device 3 are simply supplied directly to the position controller 5 as controller structure input reference value $\phi_{in-soll}$ and controller structure input actual value $\phi_{in-ist}$.

To summarize, it can therefore be said that the selection and evaluation device 3 makes available the controller structure input variables $\phi_{in-soll}$, $\phi_{in-ist}$ to the controller structure 4 in such a way that the controller device 1 can execute force control for adjusting an actuator clamping force reference value, or position control for adjusting an actuator position reference value, or speed control for adjusting an actuator speed reference value, using the same controller structure 4.

The controller device 1 represents a dynamic adjustment device and ensures that, in accordance with the selected control mode: force control M1 or speed control M2 or position control M3, M4, the clamping force or the actuator speed or the actuator position follows the corresponding reference input variable: actuator clamping force reference value $F_{soll}$, actuator speed reference value $n_{soll}$ or (absolute or relative) actuator position reference value $\phi_{soll}$, $\Delta\phi_{soll}$.

Figure 4:
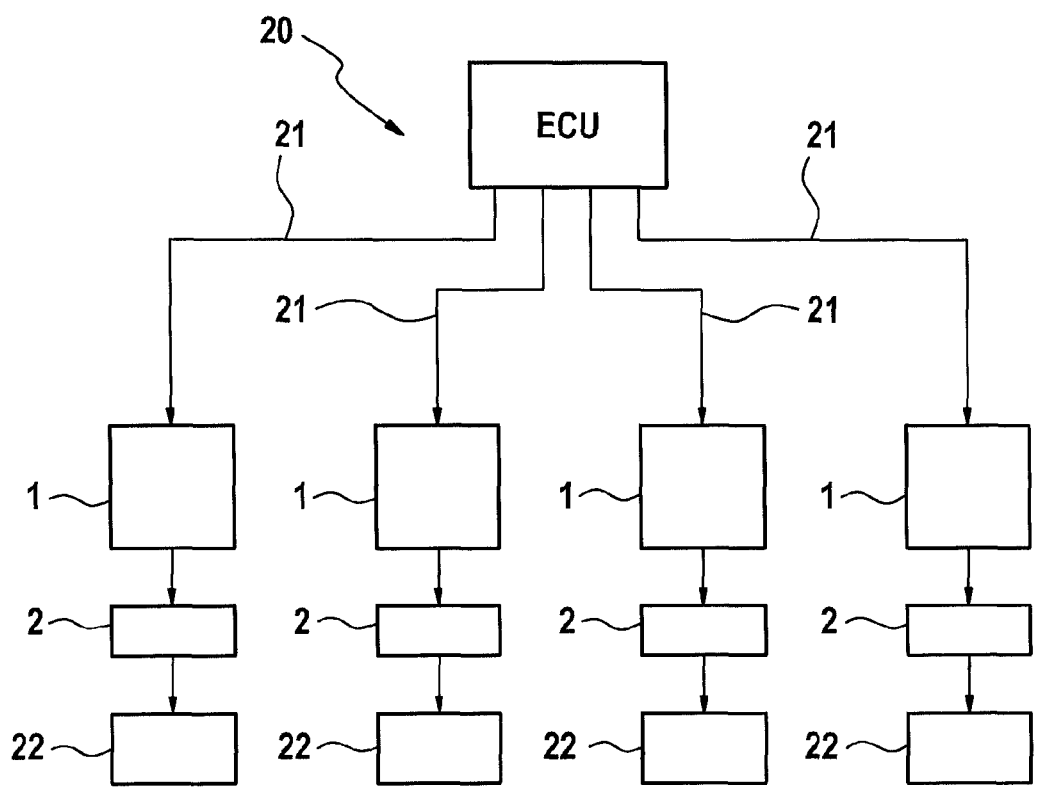
FIG. 4 shows schematically an exemplary embodiment of an electronic brake system according to the invention.

FIG. 4 represents purely schematically an exemplary embodiment of an electronic brake system according to the invention. The brake system 20 comprises a central control unit ECU and at least one electrically actuable brake 22 which can be actuated by an actuator 2 which is controlled or regulated by a controller device 1. In the example in FIG. 4, four wheel brakes 22, each having an actuator 2 and an associated controller device 1, are represented. The central control unit ECU is connected to the controller devices 1 (connections 21 are represented schematically in FIG. 4). In the central control unit ECU, with reference to the information and requests present at the control unit ECU, such as driver braking wish, demands of a slip control system (ABS: antilock system, TCS: traction control system) or driver assistance system (ESC: electronic stability control), initialization request, request regarding brake lining clearance adjustment, etc., a decision on a desired control mode (force control M1 or speed control M2 or position control M3, M4) is made and is transmitted to the controller devices 1 in the form of the control mode parameter MX. In addition, the central control unit ECU predefines for the controller devices 1, in accordance with the demand and the desired control mode, a reference value ($F_{soll}$, $\phi_{soll}$, $\Delta\phi_{soll}$, $n_{soll}$) as reference input variable for the control operation.

A controller device which can carry out the described kinds of control modes M1-M4 is advantageous in order to be able to fulfill different demands on the brake. Thus, a force control operation is carried out, for example, to set the braking force desired by the driver or in slip-controlled braking processes. A position control operation is carried out, for example, to set the clearance in a disk brake, that is, the distance between brake disk and displaceable brake lining, to a predefined value. In order to lock an electromechanical brake which includes a mechanical locking mechanism for implementing a parking brake function, a position control operation is likewise performed in order to move the actuator to the appropriate position for engaging the lock. A speed control operation may be carried out, for example, to determine the limit stop of the actuator oriented away from the brake linings.

Throughout this specification and claims, certain variable subscripts are presented in the language of the priority application from which this application originates. The following variable subscripts can be interpreted as: aus-out, soll-target or nominal, in-in, ist-actual.

While the above description constitutes the preferred embodiment of the present invention, it will be appreciated that the invention is susceptible to modification, variation and change without departing from the proper scope and fair meaning of the accompanying claims.

The invention claimed is:

1. A method for controlling a brake which can be actuated electrically by an actuator (2), comprising the steps of, determining an actuator clamping force actual value ($F_{ist}$) by providing a clamping force sensor (7), determining an actuator position actual value ($\phi ist$) or an actuator speed actual value ($n_{ist}$) by providing a position sensor (8), generating a manipulated variable (U) for activating the actuator (2) by providing a controller device (1), the controller device (1) having a selection and evaluation device (3) and a controller structure (4), the selection and evaluation device (3) supplying to the controller structure (4) a controller structure input reference value ($\phi_{in-soll}$ and a controller structure input actual value ($\phi_{in-ist}$) as controller structure input variables, and the controller structure input variables ($\phi_{in-sol}$, $\phi_{in-ist}$) being made available by the selection and evaluation device (3) wherein the controller device (1) operates using the same controller structure (4) in at least two control modes including a force control mode (M1) for adjusting an actuator clamping force reference value ($F_{soll}$), and a position control mode (M3, M4) for adjusting an actuator position reference value ($\phi_{soll}$, $\Delta\phi_{soll}$), and a speed control mode (M2) for adjusting an actuator speed reference value ($n_{soll}$).

2. The method as claimed in claim 1, further comprising in that the same controller structure input reference value ($\phi_{in-soll}$) is supplied to the controller structure (4) by the selection and evaluation device (3) as the controller structure input variables in each of the control modes (M1, M2, M3, M4).

3. The method as claimed in claim 1, further comprising using a control mode parameter (MX) which determines one or more of the control modes (M1, M2, M3, M4) to be executed by the controller device (1), as a function of the control mode parameter (MX), at least one of the actuator clamping force actual value ($F_{ist}$), or actuator position actual value ($\phi_{ist}$) and at least one actuator reference value including a force reference value ($F_{soll}$), actuator position reference value ($\phi_{soll}$), and a differential position reference valve ($\Delta\phi_{soll}$), or the actuator speed reference valve ($n_{soll}$), are supplied to the selection and evaluation device (3) included as the input variables.

4. The method as claimed in claim 3, further comprising in that the actuator clamping force actual value ($F_{ist}$) and the actuator position actual value ($\phi_{ist}$) are supplied to the selection and evaluation device (3), and in that the selection and evaluation device (3) evaluates the actuator clamping force actual value ($F_{ist}$) or the actuator position actual value ($\phi_{ist}$) as a function of the control mode parameter (MX) in order to determine the controller structure input reference value ($\phi_{in-soll}$).

5. The method as claimed in claim 2 further comprising in that the controller structure (4) includes at least one position controller (5) and in that in each of the control modes (M1, M2, M3, M4) an actuator position ($\phi$) for the controller structure input reference value ($\phi_{in-soll}$) and controller structure input actual value ($\phi_{in-ist}$) is supplied to the controller structure (4) by the selection and evaluation device (3) as the controller structure input variables.

6. The method as claimed in claim 5, further comprising providing the controller structure (4) with a position controller (5) and a speed controller (6) connected downstream of the position controller (5), and supplying an actuator speed reference value ($n_{aus-soll}$) output by the position controller (5) and supplying the actuator speed actual value ($n_{ist}$) being supplied to the speed controller (6) as the input variables.

7. The method as claimed in claim 5 further comprising in that in the force control mode (M1) at least an actuator clamping force reference value ($F_{soll}$) and an actuator clamping force actual value ($F_{ist}$) are supplied to the selection and evaluation device (3), in that, in the selection and evaluation device (3), with reference to a predefined relationship (f) between an actuator position ($\phi$) and an actuator clamping force (F), a controller structure input reference value ($\phi_{in-soll}$) is determined from the actuator clamping force reference value ($F_{soll}$), and a controller structure input actual value ($\phi_{in-ist}$) is determined from the actuator clamping force actual value ($F_{ist}$), and in that the determined controller structure input reference value ($\phi_{in-soll}$) and the determined controller structure input actual value ($\phi_{in-ist}$) are supplied to the position controller (5) of the controller structure (4) as the controller structure input variables ($\phi_{in-soll}$, $\phi_{in-ist}$).

8. The method as claimed in claim 5 further comprising in that in the speed control mode (M2) at least an actuator speed reference value ($n_{soll}$) and an actuator position actual value ($\phi_{ist}$) are supplied to the selection and evaluation device (3), in that a controller structure input reference value ($\phi_{in-soll}$) is determined from the actuator speed reference value ($n_{soll}$) in the selection and evaluation device (3), and in that the determined controller structure input reference value ($\phi_{in-soll}$) and the actuator position actual value ($\phi_{ist}$) are supplied to the position controller (5) of the controller structure (4) as controller structure input variables ($\phi_{in-soll}$, $\phi_{in-ist}$).

9. The method as claimed in claim 8 further comprising in that the controller structure input reference value ($\phi_{in-soll}$) is calculated from the actuator speed reference value ($n_{soll}$) supplied to the selection and evaluation device (3) in such a way that the actuator speed reference value ($n_{aus-soll}$) output by the position controller (5) is approximately equal to the actuator speed reference value ($n_{soll}$) which is supplied to the selection and evaluation device (3).

10. The method as claimed in claim 5 further comprising in that the controller device (1) can be operated in the position control mode (M3) with relative position control, in which at least a relative actuator position reference value indicating the desired position change ($\Delta\phi_{soll}$) of the actuator position, and the actuator position actual value ($\phi_{ist}$), are supplied to the selection and evaluation device (3), and determining a controller structure input reference value ($\phi_{in-soll}$) in the selection and evaluation device (3) from the relative actuator position reference value ($\Delta\phi_{soll}$) and from an actuator position value ($\phi_{store}$) stored before entering the position control mode (M3) with the relative position control, and in that the determined controller structure input reference value ($\phi_{in\text{-}soll}$) and the actuator position actual value ($\phi_{ist}$) are supplied to the position controller (5) of the controller structure (4) as the controller structure input variables ($\phi_{in\text{-}soll}$, $\phi_{in\text{-}ist}$).

11. A device for controlling a brake which can be actuated electrically by an actuator (2), comprising, a clamping force sensor (7) for determining an actuator clamping force actual value ($F_{ist}$), a position sensor (8) for determining an actuator position actual value ($\phi_{ist}$) or an actuator speed actual value ($n_{ist}$), and a controller device (1) which generates a manipulated variable (U) with which the actuator (2) is activated, the controller device (1) includes a selection and evaluation device (3) and a controller structure (4), a controller structure input reference value ($\phi_{in\text{-}soll}$) and a controller structure input actual value ($\phi_{in\text{-}ist}$) being supplied to the controller structure (4) by the selection and evaluation device (3) as controller structure input variables, and the selection and evaluation device (3) making available the controller structure input variables ($\phi_{in\text{-}soll}$, $\phi_{in\text{-}ist}$) for the controller structure (4) in such a way that the controller device (1) can be operated using the same controller structure (4) in at least two of the control modes including a force control mode (M1) for adjusting an actuator clamping force reference value ($F_{soll}$), a position control mode (M3, M4) for adjusting an actuator position reference value ($\phi_{soll}$, $\Delta\phi_{soll}$), and a speed control mode (M2) for adjusting an actuator speed reference value ($n_{soll}$).

12. The device as claimed in claim 11 further comprising in that the selection and evaluation device (3) is configured in such a way that the same controller structure input reference value ($\phi$) for the controller structure input reference value and the controller structure input actual value is supplied to the controller structure (4) by the selection and evaluation device (3) as the controller structure input variables in each of the control modes (M1, M2, M3, M4).

13. The device as claimed in claim 11 further comprising in that the controller structure (4) includes at least a position controller (5) and a speed controller (6) connected downstream of the position controller (5), an actuator position (q) for controller structure input reference value ($\phi_{in\text{-}soll}$) and controller structure input actual value ($\phi_{in\text{-}ist}$) being supplied to the position controller (5) by the selection and evaluation device (3) as controller structure input variables in each of the control modes (M1, M2, M3, M4), and an actuator speed reference value ($n_{aus\text{-}soll}$) output by the position controller (5), and the actuator speed actual value ($n_{ist}$), being supplied to the speed controller (6) as the input variables.

14. An electronic brake system (20) for a motor vehicle having at least one brake (22) which can be actuated electrically by means of an actuator (2) for a service brake or a parking brake function and having a control and regulation unit (ECU), further comprising the control and regulation unit (ECU) has or is connected to a device for controlling a brake which can be actuated electrically by the actuator (2), a clamping force sensor (7) for determining an actuator clamping force actual value ($F_{ist}$), a position sensor (8) for determining an actuator position actual value ($\phi_{ist}$) or an actuator speed actual value ($n_{ist}$), and a controller device (1) which generates a manipulated variable (U) with which the actuator (2) is activated, the controller device (1) includes a selection and evaluation device (3) and a controller structure (4), a controller structure input reference value ($\phi_{in\text{-}soll}$) and a controller structure input actual value ($\phi_{in\text{-}ist}$) being supplied to the controller structure (4) by the selection and evaluation device (3) as controller structure input variables, and the selection and evaluation device (3) making available the controller structure input variables ($\phi_{in\text{-}soll}$, $\phi_{in\text{-}ist}$) for the controller structure (4) in such a way that the controller device (1) can be operated using the same controller structure (4) in at least two of the control modes including a force control mode (M1) for adjusting an actuator clamping force reference value ($F_{soll}$), a position control mode (M3, M4) for adjusting an actuator position reference value ($\phi_{soll}$, $\Delta\phi_{soll}$), and a speed control mode (M2) for adjusting an actuator speed reference value ($n_{soll}$).

* * * * *